United States Patent
Qiu et al.

(10) Patent No.: US 9,354,424 B2
(45) Date of Patent: May 31, 2016

(54) LENS MODULE FOR IMAGE CAPTURE

(75) Inventors: Xiaoxiong Qiu, Suzhou (CN); Jean-Pierre Lusinchi, Suzhou (CN)

(73) Assignee: AO ETHER CORPORATION, Taichung (TW)

( * ) Notice: Subject to any disclaimer, the term of this patent is extended or adjusted under 35 U.S.C. 154(b) by 254 days.

(21) Appl. No.: 13/825,581

(22) PCT Filed: Sep. 28, 2010

(86) PCT No.: PCT/CN2010/077421
§ 371 (c)(1),
(2), (4) Date: May 10, 2013

(87) PCT Pub. No.: WO2012/040911
PCT Pub. Date: Apr. 5, 2012

(65) Prior Publication Data
US 2013/0215498 A1    Aug. 22, 2013

(51) Int. Cl.
*G02B 13/00* (2006.01)
*G02B 9/06* (2006.01)
*G02B 9/08* (2006.01)

(52) U.S. Cl.
CPC ............ *G02B 13/003* (2013.01); *G02B 9/06* (2013.01); *G02B 9/08* (2013.01)

(58) Field of Classification Search
CPC .............. G02B 9/00; G02B 9/04; G02B 9/06; G02B 9/08; G02B 13/003; G02B 5/208
USPC ................. 359/355, 708–712, 717, 740, 754, 359/793–794
See application file for complete search history.

(56) References Cited

U.S. PATENT DOCUMENTS 5,600,493 A * 2/1997 Katsuma ................ 359/717
5,691,838 A * 11/1997 Shouji ................ G02B 5/208 359/350

(Continued)

FOREIGN PATENT DOCUMENTS

CN    1763578 A    4/2006
CN    1971331 A    5/2007

(Continued)

OTHER PUBLICATIONS

Tom's Hardware US, "Micron to launch 1.75-micron pixel CMOS image sensors for cameraphones," http://www.tomshardware.com/news/micron-sensor,4308.html, Published Feb. 12, 2007, Accessed 7:00am Jan. 23, 2015.*
International Search Report and Written Opinion dated May 24, 2011.

(Continued)

*Primary Examiner* — Stephone B Allen
*Assistant Examiner* — Adam W Booher
(74) *Attorney, Agent, or Firm* — McClure, Qualey & Rodack, LLP (57) ABSTRACT

A lens module (10) for image capture comprises a first positive meniscus lens (16) having a focal length F1 and comprising a first convex optical surface (18) facing the object side (12), and a second concave optical surface (20) facing the image side (14), and a second positive meniscus lens (22) having a focal length F2 and comprising a third concave optical surface (24) facing the object side (12), and a fourth convex optical surface (26) facing the image side (14). The four surfaces follow the equations: $Z_i = CURV_i Y_i^2 / (1 + (1 - (1 - K_i) CURV_i^2 Y_i^2)^{1/2}) + (A_i) Y_i^2 + (B_i) Y_i^4 + (C_i) Y_i^6 + (D_i) Y_i^8$ and $M_i = 1 - (1 + K_i)(CURV_i)^2 (R_i)^2$ wherein: i is the surface number, $K_i$ is the conic constant of the i-th surface, $CURV_i$ is the curvature of the i-th surface at the optical axis, $A_i$, $B_i$, $C_i$, and $D_i$ are aspheric coefficients of the i-th surface, and $R_i$ is the effective radius of the aperture of the i-th surface. The following relations can be satisfied: $0.70 < F1/F2 < 1.30$  $5 < M2/M1 < 15$.

15 Claims, 5 Drawing Sheets

(56) References Cited

U.S. PATENT DOCUMENTS 7,372,639 B2 * 5/2008 Kim .............................. 359/717
7,372,644 B2 * 5/2008 Saito ............................. 359/794
7,446,958 B2 * 11/2008 Minakawa .................... 359/794

FOREIGN PATENT DOCUMENTS

| CN | 1975495 A | 6/2007 |
|----|-----------|--------|
| CN | 201035206 Y | 3/2008 |

* cited by examiner

LENS MODULE FOR IMAGE CAPTURE

CROSS REFERENCE RELATED APPLICATIONS

This application is a national phase of PCT/CN2010/077421 filed Sep. 28, 2010.

DOMAIN OF THE INVENTION

The present invention relates to optical modules such as those used for image capture in mobile phones, and in particular optical modules comprising two positive meniscus lenses, preferably able to withstand "reflow" manufacturing conditions.

BACKGROUND OF THE INVENTION

The trend to thinner and thinner mobile phones, as well as to increasing resolutions, leads to lens modules with particular designs, a lens module being constituted by an assembly of one to several lenses and diaphragms into a lens holder. Also, for modules aiming at large volumes markets a particular attention must be laid on the manufacturability, because a production of several tens of thousands of lens modules per day can be envisaged only when the manufacturing yield is close to 100%.

Depending on the customer's specifications, the constraints that have the major influence on the design are:

Effective Focal Length

The Effective Focal Length determines the overall dimension of the module. The Effective Focal Length will hereafter be referred to as EFL.

Combined with the dimension of the image that will be formed on the sensor that is used with a module, the EFL determines also the Field of View, referred to as FOV, and combined with the diameter of the Aperture diaphragm of the module, if present (or eventually the diameter of the lenses, if no diaphragm is present), determines the Aperture Number of the module, referred to as F#.

When a circular image of diameter D is formed in the focal plane of the module, the FOV is defined by the relation:

$$FOV = 2 \cdot Arctan(D/[2 \cdot EFL])$$

where Arctan is the inverse function of the tangent of an angle.

The F# has a major influence on four important parameters: the light reaching the sensor, which varies as the inverse of the square of the F#, the Depth of Field (DoF), the Hyperfocal distance (HyF) which is the minimum distance at which an object gives a neat image on the sensor, and the depth of focus (dof) which is the tolerance on the position of the sensor with respect to the lens module.

Resolution

The resolution is measured by the Modulation Transfer Function (MTF) at a given spatial frequency. The resolution characterizes the contrast between the black area and the white area in an image composed of a series of alternatively black and white stripes of equal width, the width of a pair of stripes being the inverse of the spatial frequency.

Aberrations

The aberrations are both geometric and chromatic.

The geometric aberrations include the geometric distortion, the astigmatism, and the EFL differences between various areas of the image. They depend on the curvature on axis of the lenses, and on the asphericity coefficients that define, at a given distance of the axis, the distance between the surface of a sphere having the same radius on axis and the surface of the lens.

The chromatic aberrations include the "colored fringes" (edges of an object are surrounded by parallel edges of various colors) and the "colored area" (a white image presents for example pink corners).

Targeted Costs

The targeted cost of the module depends primarily on the number of lenses that compose the module. The present invention allows reducing the aberration by defining constraints on the curvature of the lenses, rather than by adding more lenses.

Maximum Temperature

The maximum temperature range that the module can withstand during a given period of time without damage is an extremely important parameter, as the trend in the manufacturing of mobile phones is to solder all the components, including the optical module, in one single operation called "reflow" which supposes that the components withstand a temperature of 260 degree Celsius during 30 seconds, and 230 degree Celsius during 60 seconds.

Up to recently, the lenses of the optical components of high quality have been done using lenses with aspherical surfaces, made of thermoplastic materials like Polycarbonate, or Cyclo Olefin Polymer, which do not withstand such temperatures. The manufacturing of the mobile phones using such components has to be done in two steps: first soldering a socket, then inserting the module into the socket at ambient temperature, which increases the number of operations and the number of components in inventories, reduces the reliability and leads to increased costs.

With so many constraints, one can understand that a lens module is designed for a particular set of specifications. However, as very often for a given sensor, the phone makers develop several models with slightly different characteristics (slight variations on EFL, FOV, and MTF specifications). It is possible to design a module with some versatility by giving a range of variation to the various design parameters.

Many two-lens modules have been described.

A module is described in JP 2004-226595, which is composed of two positive meniscus lenses. The main characteristic of this module is to be made with resin lenses. Optical lenses made out of resin have not been widely accepted in the industry, due to reasons that are intrinsic to the material properties (limited range of refractive index, Abbe number too low, and control of the dimensions during the process).

Others two-lens modules are described in U.S. Pat. No. 6,011,660 and U.S. Pat. No. 5,739,965. These patents share the feature of having a first lens with a convex second surface.

Two others US patent, U.S. Pat. No. 6,842,295 and U.S. Pat. No. 5,801,890, describe two-lens modules sharing the feature of having a second lens with a concave image side surface.

Two Japanese patents, JP 2003-063786 and JP 3588518, describe a two-lens structure, the first lens having a negative power.

A Japanese patent, JP 2003-041258, describes a two-lens module, the second lens having the object side surface convex, and the image side surface concave near the axis and convex near the periphery.

Two US patent, U.S. Pat. No. 6,650,485 and U.S. Pat. No. 5,666,234, describe a two-lens module, the first lens being bi convex.

There are also many others publications describing two-lens modules, using a combination of convex and concave surfaces different from the present invention; for example:

U.S. Pat. No. 5,835,288, U.S. Pat. No. 5,801,890, U.S. Pat. No. 6,011,660, U.S. Pat. No. 6,104,553, U.S. Pat. No. 6,842,295, U.S. Pat. No. 6,873,474, U.S. Pat. No. 7,035,018, U.S. Pat. No. 6,876,500, U.S. Pat. No. 7,061,696, U.S. Pat. No. 7,031,080.

Japanese application JP 3027863 and U.S. Pat. No. 5,067,803 describe a module composed of two positive meniscus lenses, with a restrictive condition on the ratio between the focal length fF of the first lens and the focal length fR of the second lens, along a ratio such that: 0.85<fF/fR<1.15, which differs from the present invention.

There exist a number of publications that describe modules composed of two lenses, with restrictive conditions on the focal lengths of the lenses, or on the asphericity coefficients of the surfaces, which are tailored for particular applications and that differ from the present invention; for example: U.S. Pat. No. 5,600,493, U.S. Pat. No. 5,739,965, U.S. Pat. No. 6,335,835, U.S. Pat. No. 6,628,463, U.S. Pat. No. 6,577,456, U.S. Pat. No. 6,650,485, U.S. Pat. No. 6,882,483.

SUMMARY OF THE INVENTION

The present invention relates to a module comprising two positive meniscus lenses and having a good balance between the Sagittal and Tangential components of the MTF, preferably provided for giving an image with a resolution larger or equal to 1.3 megapixels, with an EFL shorter than 3 mm. Preferably, the lenses are made out of glass and the module is able to withstand "reflow" conditions.

An embodiment of the invention relates to an optical module having an object side and an image side; the module comprising, from the object side to the image side:

a first positive meniscus lens having a focal length F1 and comprising first and second optical surfaces, the first optical surface being convex and facing the object side, and the second optical surface being concave and facing the image side;

a second positive meniscus lens having a focal length F2 and comprising third and fourth optical surfaces, the third optical surface being concave and facing the object side, and the fourth optical surface being convex and facing the image side;

the four surfaces having their curvatures defined by the equation:

$$Zi = CURVi\, Yi^2/(1+(1-(1+Ki)CURVi^2 Yi^2)^{1/2}) + (Ai)Yi^2 + (Bi)Yi^4 + (Ci)Yi^6 + (Di)Yi^8$$

and the parameter $$Mi = 1 - (1+Ki)(CURVi)^2 (Ri)^2$$

where:

i is the surface number (i=1 to 4);

for the i-th surface, $Zi$ is the distance between a point on the aspheric surface at the height of $Yi$ above the optical axis and a plane tangent to the aspheric surface at the intersection of this surface with the optical axis;

$Ki$ is a constant called the conic constant of the i-th surface;

$CURVi$ is the curvature of the i-th surface at the intersection of this surface with the optical axis;

$Ai$, $Bi$, $Ci$, $Di$, are, respectively, the aspheric coefficients of the $2^{nd}$, $4^{th}$, $6^{th}$, and $8^{th}$ order of the i-th surface;

$Ri$ is the effective radius of aperture of the i-th surface;

the module being characterized in that the following relations are satisfied:

$$0.70 < F1/F2 < 1.30$$

$$5 < M2/M1 < 15$$

According to an embodiment of the invention, the two lenses are made of glass.

According to an embodiment of the invention, the module has an EFL shorter than 3 mm.

According to an embodiment of the invention, the module further comprises an infrared filter after the second lens on the image side.

According to an embodiment of the invention, the module further comprises a light sensor after the second lens on the image side.

According to an embodiment of the invention the module is capable of operating with a light sensor arranged after the second lens on the image side; the sensor comprising at least 1.3 megapixels with pixels smaller or equal than 1.75 micron times 1.75 micron.

According to an embodiment of the invention the module is capable of operating with a light sensor arranged after the second lens on the image side; the sensor comprising at least 2 megapixels with pixels smaller or equal than 1.75 micron times 1.75 micron.

According to an embodiment of the invention the module is capable of operating with a light sensor arranged after the second lens on the image side; the convergence of the second lens being chosen such that the light rays coming out of the second lens meet the sensor with an incidence angle of 29 degree or less.

According to an embodiment of the invention, the module has a BFL>0.4 mm.

According to an embodiment of the invention, the module has a BFL>0.7 mm.

According to an embodiment of the invention, the module comprises a stop between the first and second lenses.

According to an embodiment of the invention, the module is such that the Sagittal and Tangential MTF values, measured at a spatial frequency of 143 line pairs per mm, differ by less than 20% for a FOV varying from zero to 32 degrees and/or differ by less than 6% at an FOV of 32 degree.

According to an embodiment of the invention, the module is such that the Sagittal and Tangential MTF values, measured at a spatial frequency of 143 line pairs per mm, differ by less than 20% for a FOV varying from zero to 26 degrees.

According to an embodiment of the invention, the module is such that the Sagittal and Tangential MTF values, measured at a spatial frequency of 71.5 line pairs per mm, differ by less than 17% at an FOV varying from zero to 32 degrees and/or differ by less than 15% at an FOV of 32 degree.

According to an embodiment of the invention, the module is such that the Sagittal and Tangential MTF values, measured at a spatial frequency of 71.5 line pairs per mm, differ by less than 6% at an FOV varying from zero to 26 degrees.

DETAILED DESCRIPTION OF THE INVENTION

Figure 1:
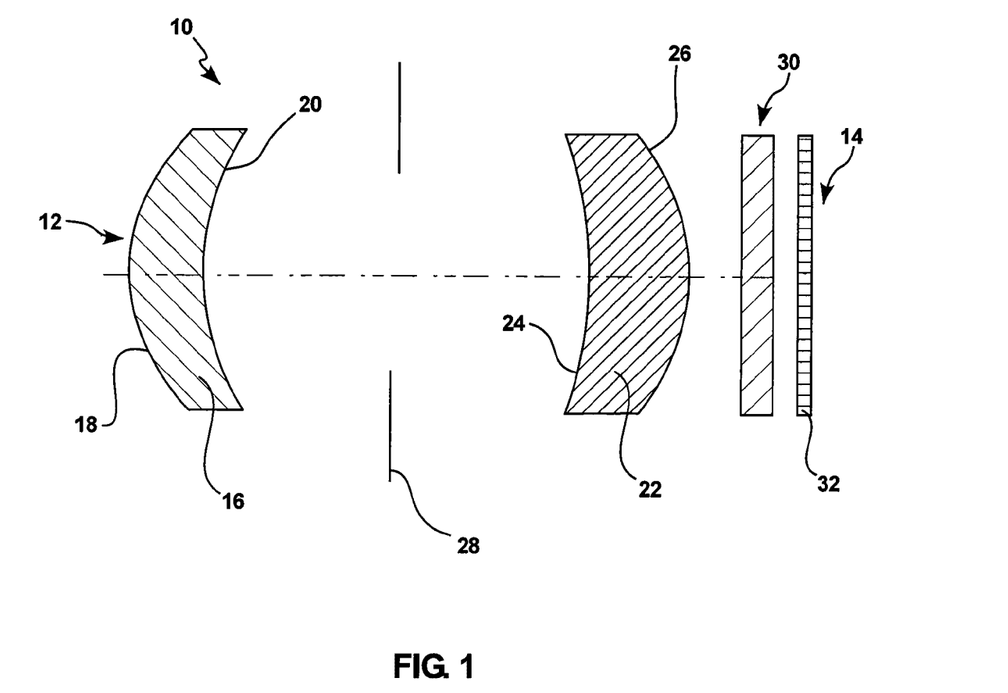
FIG. 1 illustrates a two-lens optical module according to an embodiment of the present invention.

FIG. 1 illustrates a lens optical module 10 according to an embodiment of the present invention.

Optical module 10 has an object side 12 and an image side 14; the module comprising, from the object side 12 to the image side 14: a first positive meniscus lens 16 having a focal length F1 and comprising first 18 and second 20 optical surfaces. The first optical surface 18 is convex and facing the object side 12; and the second optical surface 20 faces the image side 14. Optical module 10 then comprises a second positive meniscus lens 22 having a focal length F2 and comprising third 24 and fourth 26 optical surfaces, the third optical surface 24 facing the object side 12, and the fourth optical surface 26 being convex and facing the image side 14.

Preferably, optical module 10 comprises a stop 28 between the two lenses 16, 22. Preferably, the lenses are made out of glass.

The two surfaces of each lens are aspherical, which imposes to make these lenses by molding.

The second optical surface 20, which faces the image side 14, is concave and the third optical surface 24, which faces the object side 12, is concave.

According to the present invention, the global optical power of the module is spread between the four optical surfaces.

The inventors have noted that distribution of the power between the surfaces follows the following trade-off:

If a large amount of the total power is concentrated on the first surface, it means that the others surfaces present a low curvature. This makes these surfaces less prone to the surface to surface centering defect, which is one of the major problems to overcome in the realization of molded glass lenses. On another hand, too much power on a surface makes it sensitive to surface defects and to dimensional errors, where such defects will degrade the MTF performances. Then, while it is advantageous to concentrate a significant proportion of the total power to the first surface, this proportion must be limited.

Spreading the power between the surfaces according to the present invention also allows controlling better the geometric aberrations, which are strongly dependent on the curvature.

The focal length F of a lens which first surface has a curvature c1 and a second surface with a curvature c2, a thickness on axis equal to e, and is made of a glass with a refractive index n is given by the classic formula:

$$1/F = (n-1)(c_1 - c_2) + e \cdot c_1 \cdot c_2 \cdot (n-1)^2/n$$

According to the present invention, the glass and the shape of the lenses are chosen such that the focal lengths F1 and F2 of the first and second lenses of the module are comprised in the range:

$$0.70 < F1/F2 < 1.30 \quad [1]$$

The inventors have noted that focal lengths F1 and F2 comprised in the above range define a balance of power between the first and the second lens that allows obtaining an advantageous tradeoff between performance and cost.

The inventors have noted that if the ratio F1/F2 is smaller than the upper limit, the convergence of the second lens is limited, which makes the correction of aberrations easier.

Advantageously, limiting the convergence of the second lens as outlined above allows keeping the back focal length (BFL) large enough for eventually inserting an Infrared Filter between the second lens and a sensor for receiving light from the module. This derives from the fact that once the first lens is fixed, the BFL depends directly on the focal length of the second lens, the back focal length (BFL) being the distance on the optical axis between the second surface of the second lens and the focal plane.

According to an embodiment of the present invention, the module further comprises a filter such as an infrared filter 30 between surface 26 and image side 14.

According to an embodiment of the present invention, the module further comprises a sensor 32 between infrared filter 30 and image side 14. Preferably, the sensor comprises at least 1.3 megapixels; preferably with pixels smaller or equal than 1.75 micron times 1.75 micron.

Preferably, the filter such as infrared filter 30 is made by depositing metal oxide layers onto for example a glass plate having a thickness of about 0.3 mm. Thinner glass would be too fragile; and thicker glass would increase excessively the focal length by introducing an increase of the focal length equal to around one third of its thickness, depending on the refractive index of the glass According to the present invention, the BFL is chosen large enough to allow an easy mechanical set up, preferably with BFL>0.4 mm; and even preferably with BFL>0.7 mm.

The limitation of the convergence of the second lens also limits the maximum deviation of the light rays coming out of the second lens. According to the present invention, the maximum deviation of the light rays coming out of the second lens is preferably chosen such that the light rays coming out of the second lens meet the sensor with an incidence angle of less than 29 degree.

According to the present invention, the relation [1], together with the choice of a module composed of two positive meniscus, define a family of modules the performances of which must be detailed with the definition of the curvature of each surface.

Figure 2:
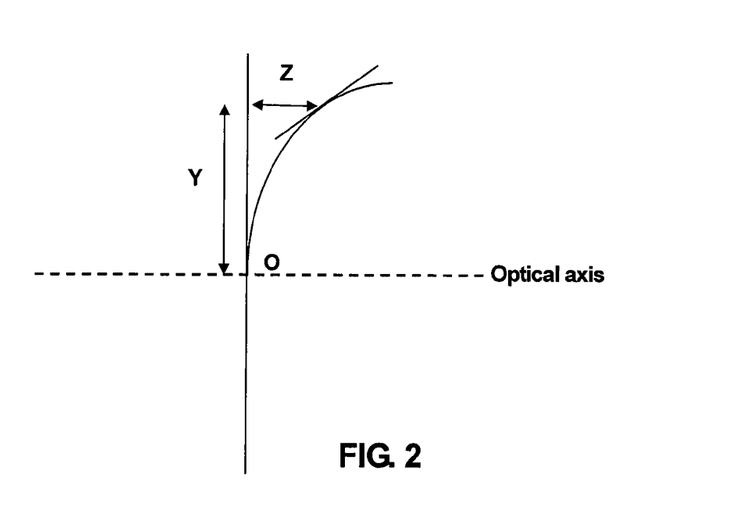
FIG. 2 illustrates the relationship between parameters Y and Z for defining the shape of a lens.

As illustrated in FIG. 2, the shape of the surfaces of each lens can be defined by values Y and Z and coefficients of asphericity (or aspheric coefficients, not shown on FIG. 2). More precisely, each surface is described as being a corrected spherical surface, the correction being defined according to the formula:

$$Z = [CURV Y^2/(1 + (1-(1+K)CURV^2 Y^2)^{1/2})] + (A)Y^2 + (B)Y^4 + (C)Y^6 + (D)Y^8$$

where:

Z is the distance between a point on the aspheric surface at the height of Y above the optical axis and a plane tangent to the aspheric surface at the intersection of this surface with the optical axis;

K is a constant called the "conic constant" of the surface;

CURV is the curvature of the surface at the intersection of this surface with the optical axis; and A, B, C, D, are respectively the aspheric coefficients of the $2^{nd}$, $4^{th}$, $6^{th}$, and $8^{th}$ order of the surface.

It can be easily seen that the first term on the right of the equation represents the coordinate of a point on a sphere with a radius 1/CURV, modified by the influence of the coefficient K.

For the small values of Y, the influence of the product (1+K)Y is small, as well as the influence of the coefficients A, B, C, etc . . . and Z defines a point very close to the sphere of radius 1/CURV tangent to the surface at the intersection of the surface with the optical axis. For larger values of Y, Z defines a surface different from the sphere, and the choice of K and of the aspheric coefficients determines the correction of the geometric aberrations.

Preferably, A is chosen null, which means that all the terms of second order in the formula are defined by the conic constant K.

According to the present invention, with Ki being the conic constant of the i-th surface, numbered in successive order from 1 for the surface of the first lens facing the object; Ri being the aperture radius of each surface; CURVi being the curvature on axis of the i-th surface, equal to the inverse of the radius on axis: CURVi=1/ri; and Mi being defined by:

$$Mi=1-(1+Ki)(CURVi)^2(Ri)^2$$

then the following relation must be satisfied:

$$5<M2/M1<15 \qquad [2]$$

The relation [1] mainly defines the constraints on the curvature of the second lens to allow a correction of the aberrations to get the correct image quality, once the first lens is determined; while the relation [2] limits the difference of asphericity between the first and second surface of the first lens, for the same purpose.

The inventors have noted that a two-lens module comprising two positive meniscus lenses complying with the constraint on the focal distances as defined by relation [1], taken in combination with the asphericity relationship of the first and second surfaces of the first lens as defined by relation [2], is a two-lens module that can be manufactured easily and at a reduced cost, and has a low level of aberrations that is generally obtained in the art only in a three-lens module.

In particular, a lens module according to the present invention can have an EFL shorter than 3 mm and can have a resolution high enough for operating with a sensor having at least 1.3 millions of pixels of 1.75 by 1.75 micron each.

Further, a lens module according to the present invention can have a resolution high enough for operating with a sensor having at least 2 millions of pixels of 1.75 by 1.75 micron each.

The performances of the optical modules can be, according to industry standards, characterized by the value of the Sagittal and Tangential components of the Modulation Transfer Function (MTF), usually called respectively Sagittal MTF (or SMTF) and Tangential MTF (or T-MTF), measured at a given spatial frequency, given in number of lines pairs per millimeters, or lppmm. (refer to Warren J. Smith "Modern Optical Engineering" Mc Graw Hill). The MTF is a function of the FOV; it is maximum for light rays close to the optical axis (these rays are called in the literature "paraxial rays". Refer to Warren J. Smith "Modern Optical Engineering" McGraw Hill), and then varies as the FOV increases. Usually, the larger the FOV, the lesser the MTF, although the function may present local minima, depending on the design of the module. Also, for the paraxial rays, which means for FOV close to zero, the S-MTF is equal to the T-MTF, which is not generally the case for rays when FOV increases. The image quality perceived by an observer depends not only on the absolute values of the S-MTF and T-MTF, but also on a good balance between S-MTF and T-MTF: the lesser the difference between S-MTF and T-MTF, the better the perceived image quality.

When used with a sensor composed of pixels of dimensions p×p, where p is expressed in microns, the spatial frequency N defined by the relation N=1000/4 p, is called the "half Nyquist frequency" and the frequency N/2 is called the "quarter Nyquist frequency).

The Sagittal and Tangential MTF values of an optical module according to the invention differ little. For example, a module according to the invention can be such that the Sagittal and Tangential MTF values, measured at a spatial frequency of 143 line pairs per mm, differ by less than 20% for a FOV varying from zero to 32 degrees and/or differ by less than 6% at an FOV of 32 degree; and/or such that the Sagittal and Tangential MTF values, measured at a spatial frequency of 143 line pairs per mm, differ by less than 20% for a FOV varying from zero to 26 degrees.

Further, a module according to the invention can be such that the Sagittal and Tangential MTF values, measured at a spatial frequency of 71.5 line pairs per mm, differ by less than 17% at an FOV varying from zero to 32 degrees and/or differ by less than 15% at an FOV of 32 degree; and/or such that the Sagittal and Tangential MTF values, measured at a spatial frequency of 71.5 line pairs per mm, differ by less than 6% at an FOV varying from zero to 26 degrees.

A number of preferred embodiments of the invention will now be described.

A/ First Embodiment

Module Having a Resolution of 2 Mega Pixels and a Focal Distance of 2.718 mm

Figure 3:
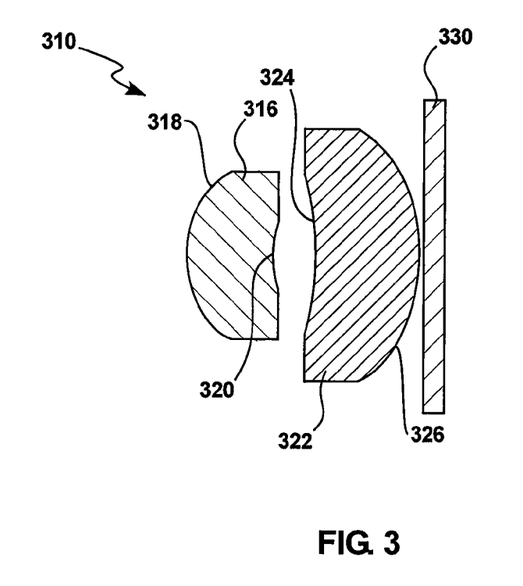
FIG. 3 illustrates a module according to an embodiment of the present invention.

FIG. 3 illustrates a module 310 according to the first embodiment, having a first positive meniscus lens 316 with a first surface 318 and a second surface 320. Module 310 comprises a second positive meniscus lens 322, with a third surface 324 and a fourth surface 326.

Preferably, module 310 comprises an infrared filter 330.

Choice of Glass Type

In this first embodiment glasses having refractive index Nd and an Abbe Number Vd were used as follows:

For Lens 316: Nd=1.7501; Vd=45.43; F1=3.104 mm;
For Lens 322: Nd=1.8043; Vd=40.48; F2=4.026 mm;
The radii of curvature on axis of the four surfaces are:
Lens 1 (316) surface 1 (318), facing the object side: r1=0.9825 mm;
Lens 1 (316) surface 2 (320), facing the image side: r2=1.0540 mm;
Lens 2 (322) surface 3 (324), facing the object side: r3=−3.8023 mm;
Lens 2 (322), surface 4 (326), facing the image side: r4=−1.9672 mm.

(The standard convention of sign is used concerning the radius: positive when the apex of the surface on axis is before the centre of curvature when going in the direction of the light.)

Aspheric Coefficients

The aperture radius R and the aspheric coefficients of the four surfaces are given in the following table:

| Surface # | K conic constant | A | B | C | D | R in mm |
|---|---|---|---|---|---|---|
| 1 | 0.3394273 | 0 | −0.067788744 | 0.44938366 | −3.2066092 | 0.8 |
| 2 | −3.897215 | 0 | 0.62791168 | 7.9231338 | 40.877251 | 0.32 |
| 3 | 1.683842 | 0 | −0.12227286 | 0.11435523 | −1.0986948 | 0.76 |
| 4 | −14.72963 | 0 | −0.24390755 | 0.12527608 | 0.076275949 | 1.19 |

The embodiment above verifies relations [1] and [2]:

| [1] | F1/F2 = 0.771 | so that 0.70 < F1/F2 < 1.30 |
| [2] | M2/M1 = 10.2328 | so that 5 < M2/M1 < 15 |

Figure 4:
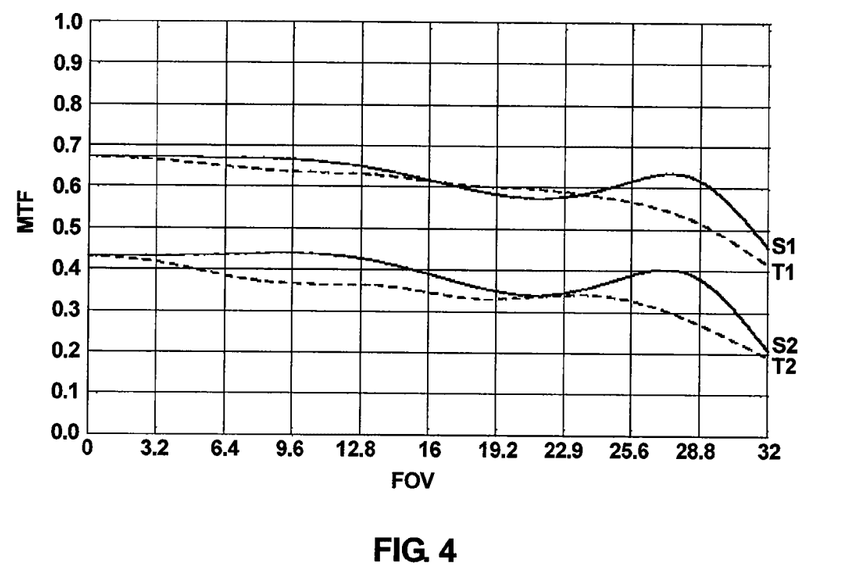
FIG. 4 illustrates the performances of the module of FIG. 3.

The performances of module 310 are summarized in FIG. 4, which illustrates the Sagittal (S) and Tangential (T) MTF versus Field of View (FOV) of the module at a quarter of the Nyquist frequency equal to 71.5 lppmm (S1, T1), and at half Nyquist frequency equal to 143 lppmm (S2, T2).

Importantly, there exist a good balance between the Sagittal and Tangential components, which results from the constraints [1] and [2]: for example, the Sagittal and Tangential MTF values differ by less than 6% for a FOV varying from zero to 26 degrees at a spatial frequency of 71.5 lppmm, and by less than 20% when the FOV varies from zero to 26 degrees, at a spatial frequency of 143 lppmm. Further, in the present embodiment, the Sagittal and Tangential MTF values also differ by less than 5% at a FOV of 32 degrees at a spatial frequency of 143 lppmm.

B/ Second Embodiment

Module Having a Resolution of 1.3 Mega Pixels and a Focal Distance of 2.175 mm

Figure 5:
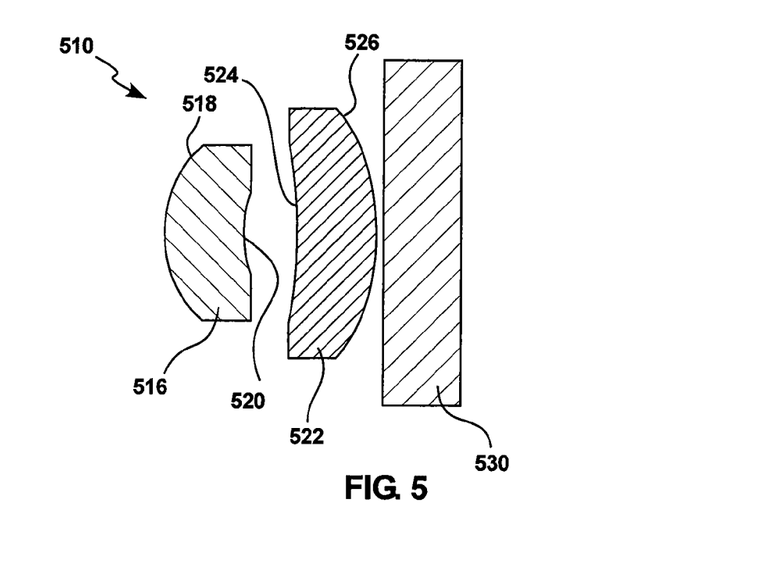
FIG. 5 illustrates a module according to an embodiment of the present invention.

FIG. 5 illustrates a module 510 according to the second embodiment, having a first positive meniscus lens 516 with a first surface 518 and a second surface 520. Module 510 comprises a second positive meniscus lens 522, with a third surface 524 and a fourth surface 526.

Preferably, module 510 comprises an infrared filter 530.

Choice of Glass Type

In this second embodiment glasses having refractive index Nd and an Abbe Number Vd were used as follows:

For Lens 516 and 522: Nd=1.8043; Vd=40.48;
For Lens 516, F1=2.895 mm;
For Lens 522, F2=3.371 mm;

The radii of curvature on axis of the four surfaces are:

Lens 1 (516) surface 1 (518), facing the object side: r1=0.7888 mm;

Lens 1 (516) surface 2 (520), facing the image side: r2=0.8177 mm;

Lens 2 (522) surface 3 (524), facing the object side: r3=−3.5263 mm;

Lens 2 (522) surface 4 (526), facing the image side: r4=−1.6444 mm;

Aspheric Coefficients

The aperture radius R and the aspheric coefficients of the four surfaces are given in the following table:

The embodiment above verifies relations [1] and [2]:

| [1] | F1/F2 = 0.8588 | so that 0.70 < F1/F2 < 1.30 |
| [2] | M2/M1 = 6.0283 | so that 5 < M2/M1 < 15 |

Figure 6:
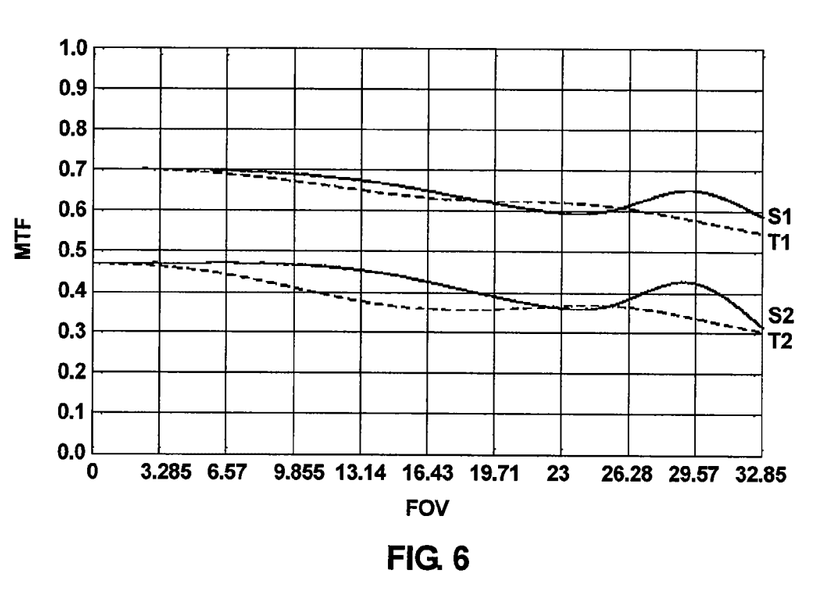
FIG. 6 illustrates the performances of the module of FIG. 5.

The performances of module 510 are summarized in FIG. 6, which illustrates the Sagittal (S) and Tangential (T) MTF versus Field of View (FOV) of the module at a quarter of the Nyquist frequency equal to 71.5 lppmm (S1, T1), and at half Nyquist frequency equal to 143 lppmm (S2, T2).

Importantly, there exist a good balance between the Sagittal and Tangential components, which results from the constraints [1] and [2]: the Sagittal and Tangential MTF values do for example differ by less than 6% for a FOV varying from zero to 26 degrees at a spatial frequency of 71.5 lppmm, and by less than 20% when the FOV varies from zero to 26 degrees, at a spatial frequency of 143 lppmm. Further, in the present embodiment the Sagittal and Tangential MTF values differ by less than 5% at a FOV of 32 degrees at a spatial frequency of 143 lppmm.

C/ Third Embodiment

Module having a Resolution of 1.3 Mega Pixels and a Focal Distance of 2.262 mm

Figure 7:
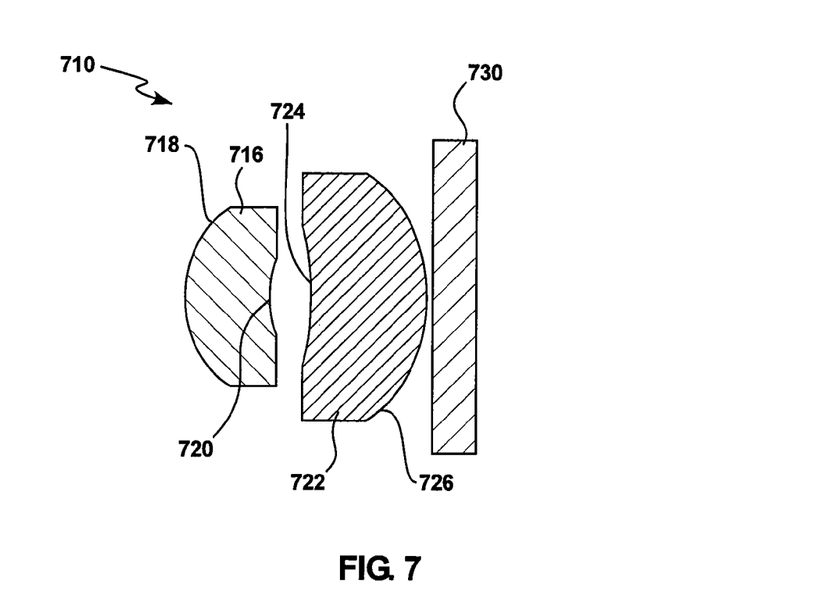
FIG. 7 illustrates a module according to an embodiment of the present invention.

FIG. 7 illustrates a module 710 according to the second embodiment, having a first positive meniscus lens 716 with a first surface 718 and a second surface 720. Module 710 comprises a second positive meniscus lens 722, with a third surface 724 and a fourth surface 726.

Preferably, module 710 comprises an infrared filter 730.

Choice of Glass Type.

n this third embodiment glasses having refractive index Nd and an Abbe Number Vd were used as follows:

For Lens 1 (716) and 2 (722): Nd=1.8043; Vd=40.48;
For Lens 1 (716), F1=3.041 mm;
For Lens 2 (722), F2=2.469 mm;

The radii of curvature on axis of the four surfaces are, with these values:

Lens 1 (716) surface 1 (718), facing the object side: r1=0.8775 mm;

Lens 1 (716) surface 2 (720), facing the image side: r2=0.8857 mm;

Lens 2 (722) surface 3 (724), facing the object side: r3=−2.6053 mm;

Lens 2 (722) surface 4 (726), facing the image side: r4=−1.3130 mm.

Aspheric Coefficients

The aperture radius R and the aspheric coefficients of the four surfaces are given in the following table:

| Surface # | K conic constant | A | B | C | D | R in mm |
|---|---|---|---|---|---|---|
| 1 | 0.5304342 | 0 | −0.18716823 | 2.0863076 | −23.571049 | 0.58 |
| 2 | −2.154817 | 0 | 1.732486 | −96.731021 | 6112.7594 | 0.27 |
| 3 | −190.9591 | 0 | −0.57373284 | 3.1598517 | −23.699489 | 0.60 |
| 4 | −0.4133389 | 0 | −0.012119911 | −0.39820273 | 1.0637157 | 0.82 |

| Sur-# | K conic constant | A | B | C | D | R in mm |
|---|---|---|---|---|---|---|
| 1 | 0.496860 | 0 | −9302 | 2.539518 | −24.443101 | 0.68 |
| 2 | −5.464803 | 0 | 1.2395969 | −27.88887 | 40.356724 | 0.29 |
| 3 | −64.02416 | 0 | −1723 | 0.89261033 | −7.0537764 | 1.85 |
| 4 | −2.298892 | 0 | −0198 | −1489 | 1.3790923 | 0.83 |

The embodiment above verifies relations [1] and [2]:

| [1] | F1/F2 = 1.231 | so that 0.70 < F1/F2 < 1.30 |
|---|---|---|
| [2] | M2/M1 = 14.62 | so that 5 < M2/M1 < 15 |

Figure 8:
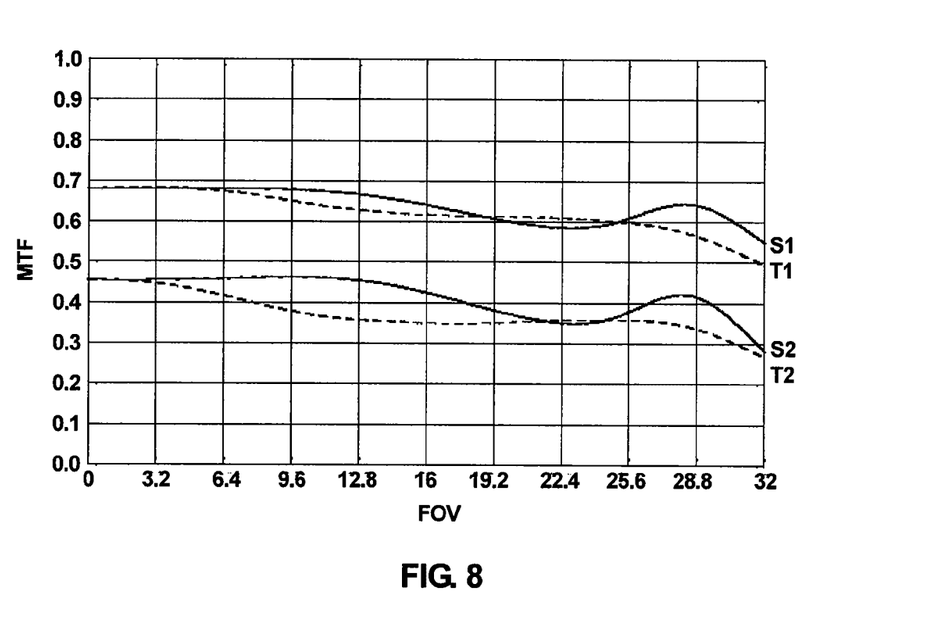
FIG. 8 illustrates the performances of the module of FIG. 7.

The performances of module 710 are summarized in FIG. 8, which illustrates the Sagittal (S) and Tangential (T) MTF versus Field of View (FOV) of the module at a quarter of the Nyquist frequency equal to 71.5 lppmm (S1, T1), and at half Nyquist frequency equal to 143 lppmm (S2, T2).

Importantly, there exist a good balance between the Sagittal and Tangential components, which results from the constraints [1] and [2]: for example, the Sagittal and Tangential MTF values differ by less than 6% for a FOV varying from zero to 26 degrees at a spatial frequency of 71.5 lppmm, and by less than 20% when the FOV varies from zero to 26 degrees, at a spatial frequency of 143 lppmm. Further, in the present embodiment the Sagittal and Tangential MTF values differ by less than 5% at a FOV of 32 degrees at a spatial frequency of 143 lppmm.

The invention claimed is:

1. An optical module having an object side and an image side; the module comprising, from the object side to the image side:
    a first positive meniscus lens having a focal length F1 and comprising first and second optical surfaces, the first optical surface being convex and facing the object side, and the second optical surface being concave and facing the image side;
    a second positive meniscus lens having a focal length F2 and comprising third and fourth optical surfaces, the third optical surface being concave and facing the object side, and the fourth optical surface being convex and facing the image side;
    the four surfaces having their curvatures defined by the equation:

$$Zi = CURVi \, Yi^2/(1+(1-(1+Ki)CURVi^2 Yi^2)^{1/2}) + (Ai)Yi^2 + (Bi)Yi^4 + (Ci)Yi^6 + (Di)Yi^8$$

and the parameter $$Mi = 1 - (1+Ki)(CURVi)^2(Ri)^2$$

where:
    i is the surface number (i=1 to 4);
    for the i-th surface, Zi is the distance between a point on the aspheric surface at the height of Yi above the optical axis and a plane tangent to the aspheric surface at the intersection of this surface with the optical axis;
    Ki is a constant called the conic constant of the i-th surface;
    CURVi is the curvature of the i-th surface at the intersection of this surface with the optical axis;
    Ai, Bi, Ci, Di, are, respectively, the aspheric coefficients of the $2^{nd}$, $4^{th}$, $6^{th}$ and $8^{th}$ order of the i-th surface;
    Ri is the effective radius of aperture of the i-th surface;
    the module being characterized in that the following relations are satisfied:

$$0.70 < F1/F2 < 1.30$$

$$5 < M2/M1 < 15.$$

2. The module according to claim 1 where the two lenses are made of glass.

3. The module according to claim 1 having an effective focal length (EFL) shorter than 3 mm.

4. The module of claim 1, further comprising an infrared filter after the second lens on the image side, wherein the infrared filter is made by depositing metal oxide layers onto a glass plate having a thickness of about 0.3 mm.

5. The module of claim 1, further comprising a light sensor after the second lens on the image side.

6. The module of claim 1, wherein the module is capable of operating with a light sensor arranged after the second lens on the image side;
    the sensor comprising at least 1.3 megapixels with pixels smaller or equal than 1.75 micron times 1.75 micron.

7. The module of claim 1, wherein the module is capable of operating with a light sensor arranged after the second lens on the image side;
    the sensor comprising at least 2 megapixels with pixels smaller or equal than 1.75 micron times 1.75 micron.

8. The module of claim 1, wherein the module is capable of operating with a light sensor arranged after the second lens on the image side;
    the convergence of the second lens being chosen such that the light rays coming out of the second lens meet the sensor with an incidence angle of 29 degree or less.

9. The module of claim 1, having a back focal length (BFL)>0.4 mm.

10. The module of claim 1, having a BFL>0.7 mm.

11. The module of any of the previous claims, comprising a stop between the first and second lenses.

12. The module according to claim 1, wherein the Sagittal and Tangential modulation transfer function (MTF) values, measured at a spatial frequency of 143 line pairs per mm, differ by less than 20% for a field of view (FOV) varying from zero to 26 degrees.

13. The module according to claim 1, wherein the Sagittal and Tangential MTF values, measured at a spatial frequency of 71.5 line pairs per mm, differ by less than 6% at an FOV varying from zero to 26 degrees.

14. The module according to claim 1, wherein the Sagittal and Tangential MTF values, measured at a spatial frequency of 143 line pairs per mm, differ by less than 6% at an FOV of 32 degrees.

15. The module according to claim 1, wherein the Sagittal and Tangential MTF values, measured at a spatial frequency of 71.5 line pairs per mm, differ by less than 15% at a FOV of 32 degrees.

* * * * *